(12) United States Patent
Bloom et al.

(10) Patent No.: US 7,875,664 B2
(45) Date of Patent: Jan. 25, 2011

(54) STABILIZED ESTER COMPOSITIONS AND THEIR USE IN FILM-FORMING COMPOSITIONS

(75) Inventors: Paul D. Bloom, Decatur, IL (US); Peter K. Fuge, Lexington, SC (US); George B. Poppe, Forsyth, IL (US); Teodora R. Tabuena-Salyers, Urbana, IL (US)

(73) Assignee: Archer Daniels Midland Company, Decatur, IL (US)

( * ) Notice: Subject to any disclaimer, the term of this patent is extended or adjusted under 35 U.S.C. 154(b) by 479 days.

(21) Appl. No.: 11/781,371

(22) Filed: Jul. 23, 2007

(65) Prior Publication Data

US 2008/0015296 A1 Jan. 17, 2008

Related U.S. Application Data

(63) Continuation of application No. 11/036,613, filed on Jan. 18, 2005, now Pat. No. 7,271,210.

(60) Provisional application No. 60/536,716, filed on Jan. 16, 2004.

(51) Int. Cl.
   *C08L 91/00* (2006.01)
   *C08L 31/00* (2006.01)
   *C11D 7/60* (2006.01)
   *C07D 307/48* (2006.01)

(52) U.S. Cl. .......................... 524/313; 524/558; 106/9; 549/205; 549/483; 549/489; 549/490

(58) Field of Classification Search ................ 524/313, 524/558; 106/9; 549/205, 483, 489, 490
   See application file for complete search history.

(56) References Cited

U.S. PATENT DOCUMENTS

| 2,741,563 | A | | 4/1956 | Robertson |
| 2,843,497 | A | | 7/1958 | Stuckey et al. |
| 3,600,290 | A | | 8/1971 | Fitko et al. |
| 4,433,155 | A | * | 2/1984 | Gilpin ........................ 549/205 |
| 4,536,519 | A | | 8/1985 | Suzuki et al. |
| 4,562,273 | A | | 12/1985 | Le Bigot et al. |
| 4,574,057 | A | | 3/1986 | Kaza et al. |
| 4,668,664 | A | | 5/1987 | Rougier et al. |
| 5,166,375 | A | * | 11/1992 | Kameoka et al. ................ 554/2 |
| 5,292,522 | A | | 3/1994 | Petereit et al. |
| 5,484,849 | A | | 1/1996 | Bors et al. |
| 6,172,122 | B1 | | 1/2001 | Lawate et al. |
| 6,174,948 | B1 | | 1/2001 | Thames et al. |
| 6,203,720 | B1 | * | 3/2001 | Thames et al. ......... 252/182.12 |
| 6,391,226 | B1 | | 5/2002 | Chauvette et al. |
| 6,616,740 | B2 | | 9/2003 | Winkowski et al. |
| 7,271,210 | B2 | | 9/2007 | Bloom |
| 2004/0039095 | A1 | * | 2/2004 | Van de Mark et al. ........ 524/315 |
| 2004/0157899 | A1 | * | 8/2004 | Merianos et al. ............ 514/375 |

FOREIGN PATENT DOCUMENTS

| JP | 56-138177 | | 10/1981 |
| JP | 56-138177 A | * | 10/1981 |
| PL | 163379 | | 3/1994 |
| WO | WO 00/56823 A1 | | 9/2000 |

OTHER PUBLICATIONS

Aly, S.M., "Preparation of omega three fatty acids and inhibition of their oxidation by different antioxidants," *Modelling, Measurement & Control, C: Energetics, Chem. & Chemical Eng., Earth, Res. Environ. Biomed. Problems* 59:1-7, A.M.S.E. (2000).

Dittmar, T., et al., "Verbesserung der Oxidationsstabilität von Fettsäuremethylester mit Antioxidatien—Grenzen des Rancimat-Tests," *Chemie Ingen. Tech.* 76:1167-1170, Wiley-VCH Verlag GmbH & Co. (Aug. 2004).

Erdélyi, A., "Autoxidation of Fatty Acids Produced from Natural Fat and Inhibition of the Oxidative Rancidity," *Fat Sci., Proc. 16th ISF Congress*, Part B, pp. 639-648, Elsevier (1983).

Franke, W., "Autoxydation und enzymatische Oxydation der ungesättigten Fettsäuren," in: *Ergebnisse der Enzymforschung* 12:89-172, Akademische Verlagsgesellschaft Geest & Portig K.G. (1951).

(Continued)

*Primary Examiner*—Michael M Bernshteyn
(74) *Attorney, Agent, or Firm*—William B. Miller

(57) ABSTRACT

This invention relates to a composition comprising, consisting of or alternatively consisting essentially of a stabilized furfural or glycol ester of a vegetable oil fatty acid and an antioxidant such as butylated hydroxy toluene. This invention also relates to latex film-forming compositions containing stabilized furfural or glycol esters, such as a stabilized propylene glycol monoester (PGME) mixture. This invention is also directed to methods of stabilizing furfural or glycol esters of a vegetable fatty acid by contacting the esters with an antioxidant such as butylated hydroxy toluene. This invention also includes methods of preparing film-forming compositions comprising a stabilized furfural or glycol ester, such as the stabilized PGME mixture disclosed herein.

16 Claims, 3 Drawing Sheets

OTHER PUBLICATIONS

Hui, Y.H., ed., "Antioxidation," in *Bailey's Industrial Oil and Fat Products*, John Wiley & Sons, Inc., New York, NY, pp. 415-419 (1996).

Jiratumnukul, N. and Van De Mark, M.R., "Preparation of Glycol Esters of Soybean Oil Fatty Acids and Their Potential as Coalescent Aids in Paint Formulations," *J. Am. Oil Chem. Soc.* 77:691-697, American Oil Chemists Society (2000).

Roginskii, V.A., "Kinetics of oxidation of polyunsaturated fatty acid esters inhibited by substituted phenols," *Kinetika I Kataliz* 31:546-552 (1990).

Saheb, S.A., et al., "Effet des acides gras sur l'activité antibactérienne du butylhydroxytoluène (BHT)," *Canadian J. Microbiol.* 24:1321-1330, The National Research Council of Canada (1978).

STNEasy Database, Accession No. 1999:281362, English language abstract of PL 163379 (Document AL1).

STNEasy Database, Accession No. 2004:756205, English translation of the title for Dittmar, T., et al., "Improvement of the oxidative stability of fatty acid methyl esters with antioxidants limitations of the rancimat test" *Chemie Ingen. Tech.* 76:1167-1170, Wiley-VCH Verlag GmbH & Co. (Aug. 2004) (Document AS1 ).

STNEasy Database, Accession No. 1954:77790, English language abstract of Franke, W., "Autoxydation und enzymatische Oxydation der ungesättigten Fettsäuren," in: *Ergebnisse der Enzymforschung* 12:89-172, Akademische Verlagsgesellschaft Geest & Portig K.G. (1951) (Document AR2).

STNEasy Database, Accession No. 1990:554718, English language abstract of Roginskii, V.A., "Kinetics of oxidation of polyunsaturated fatty acid esters inhibited by substituted phenols," *Kinetika I Kataliz* 31:546-552 (1990) (Document AT2).

Dunlop, A.P., et al., "Autoxidation of Furfural," *Ind. Eng. Chem.* 38:705-708, American Chemical Society (1946).

"A Primer on Fats and Oils," accessed online at http://www.eatright.org/cps/rde/xchg/ada/hs.xs1/nutrition_1034_ENU_HTML.htm, American Dietetic Associations, 3 pages (2001).

Patent Abstracts of Japan, English language abstract of JP 56-138177 (listed on accompanying PTO/SB/08A as document FP1).

\* cited by examiner

STABILIZED ESTER COMPOSITIONS AND THEIR USE IN FILM-FORMING COMPOSITIONS

This application is a continuation of U.S. Appl. No. 11/036,613 filed Jan. 18, 2005, which claims priority benefit under 35 U.S.C. §119 to U.S. Provisional Appl. No. 60/536,716 filed Jan. 16, 2004, the entireties of which are incorporated by reference herein.

BACKGROUND OF THE INVENTION

1. Field of the Invention

This invention relates to a composition containing stabilized furfural or glycol esters of a vegetable oil fatty acid and an antioxidant such as butylated hydroxy toluene. Such a composition is useful, for example, as an additive in latex film-forming compositions. This invention also relates to latex film-forming compositions containing a stabilized furfural or glycol ester. This invention is also directed to methods of stabilizing furfural or glycol esters of a vegetable oil fatty acid by contacting the ester with an antioxidant such as butylated hydroxy toluene. This invention also includes methods of preparing film-forming compositions comprising the stabilized furfural or glycol esters such as the stabilized PGME mixtures disclosed herein.

2. Related Art

A coating composition is generally film-forming. "Film-forming", as used herein, means that the coating composition has a minimum Film Forming Temperature (MFT) at, or below, the ambient temperature, to allow for fusion of the polymer into a continuous film. Volatile organic compounds (VOCs), such as coalescents, can be used to temporarily lower the MFT of a coating composition, allowing the polymer to form a film at a temperature below the glass transition temperature (Tg) of that polymer.

Water-based latex paint is comprised of an aqueous dispersion of pigments and latex particles that impart substrate hide, water resistance, and durability to the solid paint film. Other components such as dispersants, surfactants, and thickeners are added to the liquid paint to maintain a stable dispersion and suspension of the pigments and latex particles. Solvents, bases, defoamers, and biocides are also incorporated to improve liquid stability, application performance and film formation properties. The chemical composition of water-base latex paints is designed to allow dispersion of components in water, yet maintain water resistance upon curing and forming a dry paint film. Essentially, the compositions are designed to contain a hydrophobic component for water resistance as a paint film, and a hydrophilic component to improve stability, solubility, and dispersion in the liquid aqueous phase.

A latex polymer is a high molecular weight component which imparts water resistance and durability to the dry paint film. These latex polymers include polymerization and co-polymerization products of: vinyl acetate, acrylic acid, methacrylic acid, styrene, alpha-methyl styrene, butadiene, acrylates, methacrylates, vinyl chloride, vinylidene chloride and acrylonitrile containing monomers. Particularly important are polymers and co-polymers of alkyl acrylates, alkyl methacrylates, styrene, and vinyl acetate.

Latex polymers are the film-forming portions of the paint film, and are prepared by an emulsion polymerization reaction. Aggregation of polymer particles is typically discouraged by including a stabilizing surfactant in the polymerization mix. In general, the growing latex particles are stabilized during emulsion polymerization by one or more surfactants such as an anionic or nonionic surfactant, or a mixture thereof, as is well known in the polymerization art. Many examples of surfactants suitable for emulsion polymerization are given in McCutcheon's Detergents and Emulsifiers (MC Publishing Co., Glen Rock, N.J.), published annually. Generally, emulsion polymerization consists of using nonionic surfactants to create monomer micelles within the water phase.

The effectiveness of the latex polymer in forming a film after the paint has been deposited upon a surface depends upon the Tg of the polymer and the temperature at which the paint film is allowed to dry. Coalescing aids, compounds compatible with the polymer, have been used in latex paints to plasticize (soften) the latex polymer to allow the formation of a continuous film with optimum coating properties once the water has evaporated. Without the coalescing aid, the coatings may crack and fail to adhere to the substrate when dry. Traditionally, such coalescing aids (generally alcohol esters and ethers) are volatile and leave the film after they have enabled the polymer to coalesce into an integral film. Once the coalescing aids are gone, the original hardness of the polymer, defined by its initial Tg, returns yielding a tougher and more resistant coating.

One problem encountered by the coatings manufacturers is the development of formulations containing low VOC-coalescing aids or plasticizers. For instance, emulsion polymers are currently formulated with coalescing aids or plasticizers in order to form films at and below ambient conditions yet dry to films of sufficient Tg to perform adequately at and above room temperature. In general, the ability of emulsion polymers to form or coalesce into film is governed by the MFT of the polymer in question, which typically approximates Tg of that polymer. Thus, there is a dilemma, i.e., low MFT polymers are required in order to exhibit coalescence, flow, and surface wetting properties. However, if the polymer remains soft and tacky, the coatings are not usable. Therefore, it is necessary to develop a technology in which coating formulations contain suitable ingredients with an initial low MFT, followed upon application forms nontacky, durable, hard, and water resistant surfaces having a Tg significantly above their MFT.

In contrast to latex compositions, oil-based compositions, e.g., oil-based paints, commonly employ vegetable oils such as linseed oil or tung oil and/or vegetable oil co-reacted with other compounds (such as alkyd resins) as a component of the vehicle in the paint. The vegetable oils, which are also referred to in the art as "drying oils", form crosslinked films upon exposure to air. Like all vegetable oils, these drying oils are triesters of various fatty acids and glycerol. However, unlike most vegetable oils, the fatty acids in drying oils have a very high degree of unsaturation (high iodine value), are high in polyunsaturated fatty acids, and generally have a majority of fatty acids that contain 3 or more double bonds (such as linolenic [cis-9-cis-12-cis-15-Octadecatrienoic] acid, eleostearic [cis-9-trans-11-trans-13-Octadecatrienoic] acid, and 4-Oxo-cis-9-trans-11-trans-13-Octadecatrienoic acid). Semi-drying oils have moderate to high degrees of unsaturation, and are high in polyunsaturated fatty acids, but contain lower levels of fatty acids that have 3 or more double bonds. The use of such reactive drying oils in oil based paints helps to provide a paint film which is hard and durable. Thus, the drying oils and co-reacted vegetable oil products (alkyds) are desirable components of oil-based compositions. However, oil based compositions typically comprise large proportions of VOCs as solvents or additives, e.g., 380 to 450 grams per liter (g/l) or more. Such high concentrations of VOCs are environmentally undesirable.

Latex compositions, on the other hand, typically comprise very low concentrations of VOCs, e.g. less than about 250 g/l, and thus are more environmentally compatible. Accordingly, it would be desirable to incorporate the drying oils of oil-based compositions into latex compositions to promote crosslinking of the latex compositions. However, the drying oils used in oil-based compositions are not water-soluble and accordingly cannot readily be used in latex compositions.

A latex or emulsion composition containing drying oils is disclosed in U.S. Pat. Nos. 6,203,720 and 6,174,948. The compositions disclosed in these patents contain crosslinkable monomers having a fatty acid residue derived from semi-drying or non-drying oils and chemically attached to ethylenically unsaturated carboxylic acids. The monomers are polymerized to yield a latex polymer resin with oxidative cross-linking capability.

It is desirable to develop a latex paint formulation which incorporates components that can react during the curing process, and thereby help form a durable, water-resistant paint film. It is also desirable to reduce the amounts of VOCs, such as coalescing solvents, which are environmentally undesirable.

PGME mixtures can be used to replace traditional coalescing solvents such as 2,2,4-trimethyl-1,3-pentanediol monoisobutyrate (Trade name: Texanol) (N. Jiratumnukul and M. R. Van De Mark, J. Am. Oil. Chem. Soc., 2000, 77, 691-697). Traditional coalescing solvents are VOCs. Thus, it is desirable to minimize the use of these solvents or replace them entirely with non-volatile compounds. PGME mixtures behave as coalescing solvents, but such PGMEs are non-volatile. Thus, PGME remains in the dried film.

The yellowing of dried films containing PGME has been attributed to the presence of PGME in the dried film. Further, in these paints, in-can yellowing is also attributed to the presence of PGME. It is desirable to formulate a latex film-forming composition that contains PGME mixtures as coalescing solvents but exhibit yellowing similar to coatings containing traditional coalescing solvents.

SUMMARY OF THE INVENTION

This invention relates to a composition comprising, consisting of or alternatively consisting essentially of a stabilized furfural or glycol ester of a vegetable oil fatty acid and an antioxidant such as butylated hydroxy toluene. This invention also relates to latex film-forming compositions containing stabilized furfural or glycol esters, such as a stabilized propylene glycol monoester (PGME) mixture. This invention is also directed to methods of stabilizing furfural or glycol esters of a vegetable fatty acid by contacting the esters with an antioxidant such as butylated hydroxy toluene. This invention also includes methods of preparing film-forming compositions comprising a stabilized furfural or glycol ester, such as the stabilized PGME mixture disclosed herein.

BRIEF DESCRIPTION OF THE DRAWINGS/FIGURES

DETAILED DESCRIPTION OF THE INVENTION

Figure 1:
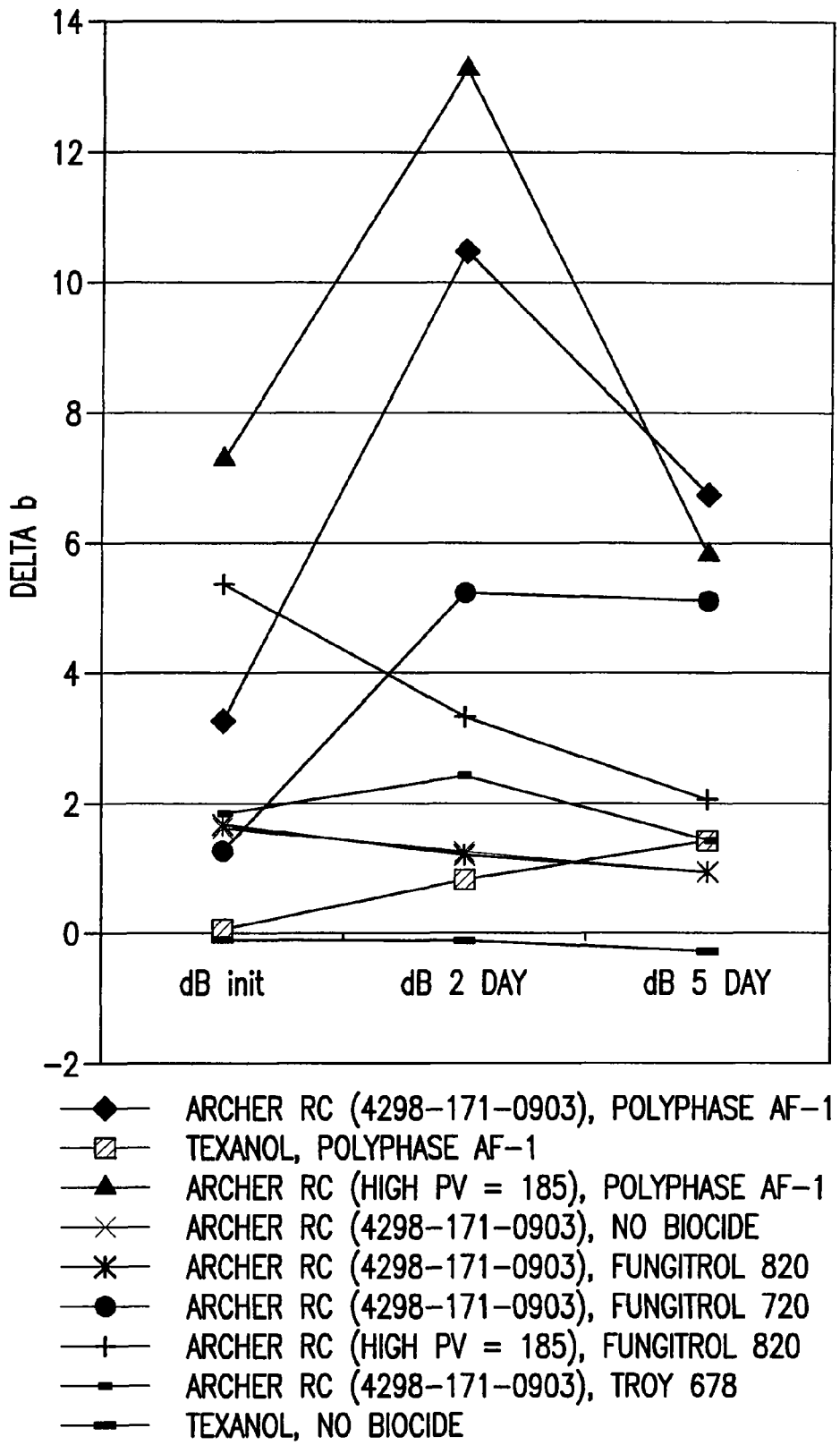
FIGS. 1 and 2 depict yellowing of coatings which contain specified latex resins and stabilized or non-stabilized PGME, or commercial coalescent.

The present invention is based on the finding that a glycol ester composition such as a PGME can be stabilized by contacting with an antioxidant such as butylated hydroxy toluene (BHT). Other useful antioxidants include any phenolic antioxidant. Esters suitable for all aspects of the present invention that are other than glycol esters are also described herein. Although not wishing to be bound by theory, the antioxidant such as BHT may act to maintain a low peroxide value or prohibit the peroxide value from increasing to a high value. The BHT stabilized PGME has been incorporated into latex film-forming compositions where the formulation exhibits a higher resistance to in-can yellowing and yellowing in the dried film coating than formulations with non-stabilized PGME.

In one aspect the present invention is directed to a stabilized glycol ester composition. Such a composition comprises, consists essentially of or alternatively consists of a glycol ester of a vegetable oil fatty acid to which an amount of an antioxidant such as butylated hydroxy toluene (BHT) or other phenolic antioxidant has been incorporated. A glycol ester composition comprises monoesters, residual diesters, monoglycerides and other impurities depending on the starting materials used in preparing a glycol ester composition.

The invention is also directed to esters other than glycol esters, in particular esters of 5-hydroxymethyl furfural:

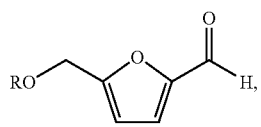

where R is a vegetable oil fatty acid residue that is bonded to the furfural moiety via an ester linkage (RO). Furfural derivatives capable of forming esters with a vegetable oil fatty acid are also suitable for the present invention. A person of ordinary skill in the art having read and understood the present disclosure will recognize that furfural esters can be contacted with an antioxidant in the same manner as described herein for glycol esters. Further, stabilized furfural esters can be incorporated into latex film-forming compositions. A latex film-forming composition comprising a stabilized furfural ester will preferably contain a stabilized furfural ester composition as described herein that is light in color. The stabilized furfural ester will preferably have a peroxide value below about 50, and more preferably below about 10. The latex film-forming composition can further comprise a UV stabilizer and other additives such as biocides, pigments, thickeners, etc. that are useful in formulating film-forming compositions.

The amount of antioxidant combined with the furfural or glycol ester composition is sufficient to maintain a low peroxide value or prohibit the peroxide value from increasing to a high value. In particular, any amount of antioxidant that produces this effect falls within the scope of this invention, and it has been discovered that an amount of BHT from about 1.0 percent to about 0.05 percent by weight of the glycol ester provides a sufficiently stabilized glycol ester composition. More preferably, the amount is between about 0.5 percent to about 0.20 percent. It has been discovered that the peroxide value of a glycol ester composition can be maintained or inhibited from rising to an unacceptable level for commercial purposes by contacting with BHT. A stabilized glycol ester composition, such as a stabilized PGME mixture, has been successfully incorporated into latex film-forming compositions. Preferably, the stabilized glycol ester composition has a peroxide value below about 50. Most preferably, the peroxide value is below about 10.

Prior to stabilization, the ester composition is prepared by contacting a furfural or glycol with a vegetable oil fatty acid through means that are known in the art. Preferably, the furfural or glycol ester composition produced is a monoester mixture. A monoester mixture is a composition comprising a high percentage of monoester in terms of the ratio of mono- to diesters comprising the product. A monoester mixture can contain some residual diesters, monoglycerides and other impurities depending on the starting materials. Preferably, the stabilized furfural or glycol ester composition is composed of at least about 50 percent monoesters. More preferably, the stabilized furfural or glycol ester composition is composed of at least about 80 percent monoesters.

The glycol is selected from the group consisting of ethylene glycol, propylene glycol, diethylene glycol, dipropylene glycol and the like. Other glycols include the following structures:

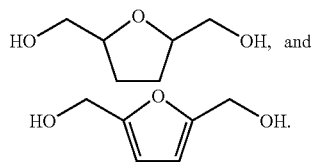

The preferred polyol is propylene glycol, which includes individual isomers and d,l-propylene glycol.

The vegetable oil fatty acid is derived from a vegetable oil. The vegetable oils suitable for preparing the fatty acid portion of the furfural or glycol ester composition include a genetically modified oil, soybean oil, linseed oil, corn oil, sunflower oil, canola oil, rapeseed oil, coconut oil, palm kernel oil, palm oil, cottonseed oil, peanut oil, coconut oil, tung oil and safflower oil and derivatives and mixtures thereof. Preferably the vegetable oil is a polyunsaturated vegetable oil. Most preferably, the polyunsaturated vegetable oil is low in C18:3 or higher fatty acids. Although any polyunsaturated oil that has sufficiently low levels of C18:3 or higher fatty acids is suitable, preferably, the vegetable oil is safflower oil, sunflower oil or corn oil. Preferably, the polyunsaturated vegetable oil contains less than about 2 percent of C18:3 or higher polyunsaturated fatty acids. Also preferred are polyunsaturated vegetable oils containing less than about 2 percent linolenic acid. More preferably, the linolenic content is less than about 1 percent. Most preferably, this oil is safflower, sunflower or corn oil.

In a most preferred embodiment, the stabilized glycol ester composition is a stabilized propylene glycol monoester (PGME) mixture. A PGME mixture is a composition comprising monoesters, diesters, monoglycerides, polyols and alcohols. A monoester mixture is a composition comprising a high percentage of monoester in terms of the ratio of mono- to diesters comprising the product. A monoester mixture can contain some residual diesters, monoglycerides and other impurities depending on the starting materials. Preferably, the stabilized PGME mixture is composed of at least about 50 percent PGMEs. More preferably, the stabilized PGME mixture is composed of at least about 80 percent PGMEs.

Preferably, the stabilized furfural or glycol ester composition has a Lovibond color below about 0.6 Red and below about 1.5 Yellow. Most preferably, the color is below about 0.4 Red and below about 1.0 Yellow.

The stabilized furfural or glycol ester composition can additionally contain a UV stabilizer. Such stabilizers are known in the art and examples include: Cytek-Cyasorb UV-24, UV-1164, UV-531, UV-5357, UV-2337, UV-5411 and the like.

In another aspect, the present invention is directed to a latex film-forming composition comprising a stabilized furfural or glycol ester composition. Suitable stabilized furfural and glycol ester compositions are described above.

A stabilized ester composition is formed by the combination of a furfural or glycol ester of a vegetable oil fatty acid and an antioxidant, such as BHT. Suitable and preferred furfurals and glycols and vegetable oil fatty acids are described above. For incorporation into latex film-forming compositions, there are several advantages disclosed herein for incorporating a stabilized furfural ester or glycol ester composition. Further, the preferred stabilized furfural or glycol ester compositions outlined above are also preferred for incorporation into latex film-forming compositions.

The latex film-forming composition comprises a stabilized furfural or glycol ester composition composed of at least about 50 percent monoesters. More preferably, the stabilized furfural or glycol ester is composed of at least about 80 percent monoesters. A monoester mixture is a composition comprising a high percentage of monoester in terms of the ratio of mono- to diesters comprising the product. A monoester mixture can contain some residual diesters, monoglycerides and other impurities depending on the starting materials.

Preferably the vegetable oil used for preparing the furfural or glycol ester composition is a polyunsaturated vegetable oil. The polyunsaturated fatty acid moiety promotes a more desirable dry film due to oxidative crosslinking at the sites of unsaturation. Most preferably, the polyunsaturated vegetable oil is low in C18:3 or higher fatty acids. It has been discovered that lower levels of C18:3 or higher fatty acids yields a superior film-forming composition in terms of resistance to yellowing. Although any polyunsaturated oil that has sufficiently low levels of C18:3 or higher fatty acids is suitable, preferably, the vegetable oil is safflower oil, sunflower oil or corn oil. Preferably, the polyunsaturated vegetable oil contains less than about 2 percent of C18:3 or higher polyunsaturated fatty acids. Also preferred are polyunsaturated vegetable oils containing less than about 2 percent linolenic acid. More preferably, the linolenic content is less than about 1 percent. Most preferably, this oil is safflower, sunflower or corn oil.

The stabilized furfural or glycol ester composition should have a peroxide value that is appropriate for commercial use in a latex film-forming composition. Preferably, the peroxide value is below about 50. More preferably, the peroxide value is below about 10.

In a most preferred embodiment, the latex film-forming composition comprises a stabilized PGME mixture. Preferably, the stabilized PGME contains at least about 80 percent monoesters. The latex film-forming compositions incorporating a stabilized PGME mixture have been shown to have lower yellowing in the can and in the dry film when compared to formulations using non-stabilized PGME.

For incorporation into a latex film-forming composition, the stabilized furfural or glycol ester composition should be light in color so that the final color of the latex film-forming composition is not adversely affected by contacting with a stabilized ester composition. In preferred embodiments, the stabilized furfural or glycol ester composition has a Lovibond color of less than about 0.6 Red and about 1.5 Yellow. More preferably, the latex film-forming composition comprises a furfural or glycol ester having a Lovibond color of less than about 0.4 Red and about 1.0 Yellow.

In all embodiments, the preferred stabilized glycol ester composition is a stabilized PGME mixture as described above.

The latex film-forming composition containing a stabilized furfural or glycol ester composition can additionally contain a UV stabilizer. Such stabilizers are known in the art and examples include: Cytek-Cyasorb UV-24, UV-1164, UV-531, UV-5357, UV-2337, UV-5411 and the like. When used as an ingredient in the stabilized furfural or glycol ester component of a latex film-forming formulation, the UV stabilizers may further minimize any yellowing that may occur in the can or in the dry film.

The latex film-forming composition can also include a biocide.

Biocides are known in the art. They are especially useful, but are not limited to, coatings for exterior surfaces, such as exterior house paint. It has been found that certain biocides, or active ingredients in the biocides, when used in combination with a stabilized furfural or glycol ester provide the latex film-forming composition with better resistance to yellowing. Preferable biocides include Fungitrol 820 (active ingredient: 3-iodo-2-propynyl butyl carbamate), Fungitrol 720, Polyphase CST, Rozone 2000 (active ingredient: 4,5-dichloro-2-n-octyl-4-isothiazolin-3-one) and Polyphase 678 (active ingredient: methyl benzimidazole-2-yl carbamate 15%, 3-iodo-2-propynyl butyl carbamate 5%). Other biocides suitable for use with the present invention include Polyphase AF-1, Polyphase EX634-2, Omacide IPBC 30, Polyphase P-20T all of which contain 3-iodo-2-propynyl butyl carbamate. Thus, any biocide containing 3-iodo-2-propynyl butyl carbamate can be used with the present invention. Other useful biocides include Polyphase 663 (active ingredient: Diuron (3-(3,4-dichlorphenyl)-1,1-dimethylurea 15%, methyl 2-benzyimidasolecarbamate 9%, 3-iodo-2-propynyl butyl carbamate); and Acticide EPW (active ingredient: benzimidazole carbamate.

The latex film-forming composition can also include one or more pigments. When formulated with pigments, the latex film-forming composition can be used to visually conceal a substrate. In this aspect the latex film-forming composition is essentially a paint. While the formulation benefits from lower VOC because the stabilized furfural or glycol ester, such as a stabilized PGME mixture, replaces a typical coalescing solvent, the formulation resists the typical yellowing that is attributed to the presence of non-stabilized PGME.

The latex film-forming composition may further contain additives such as thickeners, dispersants, surfactants and rheologic modifiers necessary to produce an end product with the desirable characteristics such as in-can stability, gloss, etc.

In yet another aspect, the present invention is directed to a method of stabilizing a furfural or glycol ester of a vegetable oil fatty acid ester comprising contacting an amount of an antioxidant such as BHT to the furfural or glycol ester composition to maintain a low peroxide value or prohibit the peroxide value from increasing to a high value.

Suitable furfural or glycol ester compositions and preferred embodiments for stabilization with an antioxidant such as BHT are as described above.

The amount of antioxidant such as BHT combined with the furfural or glycol ester composition is sufficient to maintain a low peroxide value or prohibit the peroxide value from increasing to a high value. The antioxidant can be combined at any time while the peroxide value is at an acceptable level. Generally, the antioxidant such as BHT will be combined as soon as possible after providing a furfural or glycol ester composition so that the peroxide value does not rise to an unacceptable level. It is desirable to combine the antioxidant immediately after synthesis to provide or maintain the lowest peroxide value. Although any amount of antioxidant that produces this effect falls within the scope of this invention, it has been discovered that an amount of BHT from about 1.0 percent to about 0.05 percent provides a sufficiently stabilized glycol ester composition. More preferably, the amount of BHT is between about 0.5 percent and 0.20 percent.

Preferably, prior to stabilization, the furfural or glycol ester composition has a peroxide value below about 50. Most preferably, the peroxide value is below about 10.

The method of stabilizing a furfural or glycol ester of a vegetable oil fatty acid can further include additionally combining a UV stabilizer. Such stabilizers are known in the art and examples include: Cytek-Cyasorb UV-24, UV-1164, UV-531, UV-5357, UV-2337, UV-5411 and the like. As used herein the UV stabilizers may provide for additional maintenance of peroxide values. When used as part of the stabilized furfural or glycol ester composition where the composition is an ingredient in a paint formulation, the UV stabilizers may further minimize any yellowing.

In another aspect, the present invention is directed to a method of preparing a latex film-forming composition comprising contacting a stabilized furfural or glycol ester of a vegetable oil fatty acid to a film-forming formulation.

In a preferred embodiment, the method comprises contacting a stabilized PGME mixture, wherein all suitable and preferred PGME mixtures are as described above. Most preferably, the PGME mixture combined during the method of preparing a latex film-forming composition contains at least 80% monoesters. Further, it is equally desirable that the PGME mixture has a peroxide value below about 50. Also the PGME mixture preferably has a Lovibond color below about 0.6 Red and below about 1.5 Yellow. Most preferably, the Lovibond color is less than about 0.4 Red and about 1.0 Yellow.

The present invention is based on the discovery that stabilized PGME mixtures are more resistant to yellowing than non-stabilized PGME mixtures. Formulations containing the stabilized PGME mixture can rival formulations containing traditional coalescing solvents in terms of minimizing in-can yellowing and yellowing of the dried film.

EXAMPLES

Example 1

Film-forming compositions consisting of a resin, coalescent and biocide were formulated to test yellowing in latex coatings. Approximately 88 g of AC-2508 (Rohm and Haas acrylic resin), 3.3 g of coalescent and 2.7 g of biocide as identified in FIG. 1, were blended together, mixed and allowed to stand in an oven at 140° F. for 10 days. After this time, the mixtures were removed from the oven, cooled to room temperature and applied to Lenetta drawdown charts with a 3 mil applicator bar. The films were allowed to dry for several hours and then read with a calorimeter. The color of the films (delta b value in LAB color system) was monitored over time in the cast films held at room temperature. The standard use for all color measurements was AC-2508 and Texanol (Eastman) with no biocide, that was mixed and immediately cast as a film with no heat aging. PGMEs such as Archer RC containing BHT at 0.2% and high peroxide value PGME (peroxide value=185) with no BHT were compared. Higher delta b values represent increased yellowing.

As seen in FIG. 1, initial yellowing was most severe with Polyphase AF-1 (Troy) and high peroxide value PGME containing no BHT. Higher initial yellowing was observed in all PGME containing examples in comparison to the Texanol/ Polyphase AF-1 sample. High peroxide value PGME containing no BHT in combination with Fungitrol 820 (ISP) showed improved recovery over time in the film. Even lower yellowing was observed when low peroxide value, BHT stabilized PGME (Archer RC 4298-171-0903) was used in conjunction with Fungitrol 820. In fact, the )b value of this film after 5 days was lower than that of the Texanol/Polphase AF-1 sample. Therefore, the combination of BHT stabilized PGME in combination with Fungitrol 820 is a preferred formulation. However, Fungitrol 720 (ISP) and 678 (Troy) both showed lower yellowing than compositions containing PGME and Polyphase AF-1. The improved performance of the film-forming composition containing the Fungitrol 820 may be attributed to the UV stabilizer contained in 820 because 720 does not contain such a stabilizer. PGME inherently had higher yellowing than Texanol in combination with AC-2508.

Example 2

Figure 2:
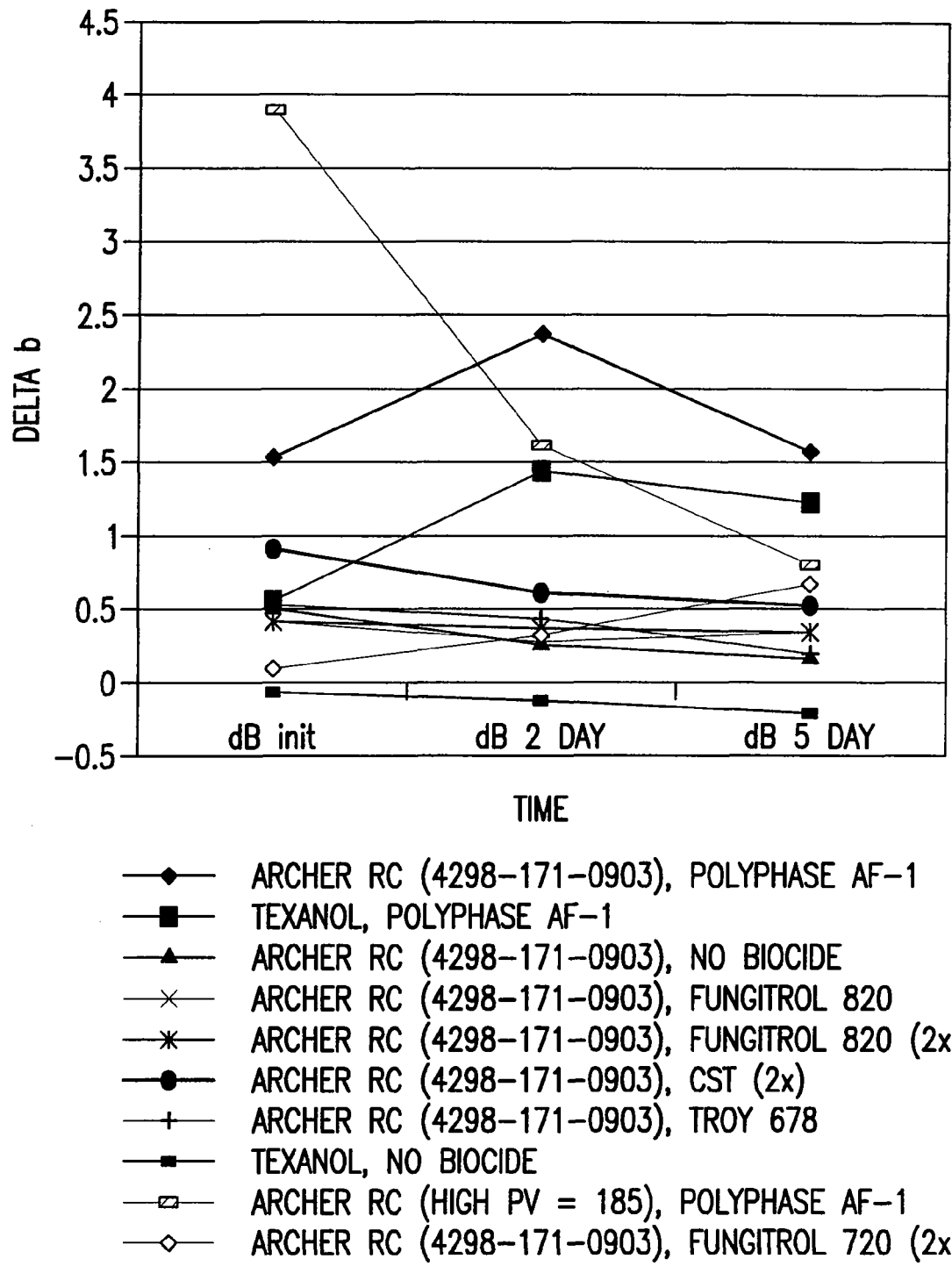

Similar experiments were carried out as in example 1 with a different resin, SG-10M (Rohm & Haas, acrylic latex polymer). Approximately 88 g of SG-10M, 3.3 g coalescent and 2.7 g of biocide, as identified in FIG. 2, were blended together, mixed and allowed to stand in an oven at 140° F. for 6 days. After this time, the mixtures were removed from the oven, cooled to room temperature and applied to Lenetta drawdown charts with a 3 mil applicator bar. The films were allowed to dry for several hours and then read on a colorimeter. The color of the films (delta b value in LAB color system) was monitored over time in the cast films held at room temperature. The standard use for all color measurements was SG-10M and Texanol (Eastman) with no biocide, that was mixed and immediately cast as a film with no heat aging. PGMEs (Archer RC) containing BHT at 0.2% and high peroxide value PGME (peroxide value=185) with no BHT were compared.

Initial yellowing was highest with SG-10M containing high peroxide value PGME with no BHT in combination with Polyphase AF-1 (Troy). Reduction of yellowing in comparison to the Texanol/Polyphase AF-1 was observed when BHT stabilized PGME was used in combination with Fungitrol 820 (ISP), Polyphase CST (Troy), Polyphase 678 (Troy) and Fungitrol 720 (ISP). The Fungitrol 720 sample continued to show an increase in yellowing over time in contrast to the Fungitrol 820 samples that maintained their )b values. The difference was again attributed to the UV stabilizer contained in the Fungitrol 820 that is not present in the Fungitrol 720. The levels of several biocides were doubled and are indicated by a (2×) in FIG. 2. In "2×" samples, PGME again showed reduced yellowing in comparison to Texanol/Polyphase AF-1 after 2 days. For Fungitrol 820, 720 and Polyphase 678, the delta b values were consistently lower than Texanol/Polyphase AF-1 at all reported times.

Example 3

Figure 3:
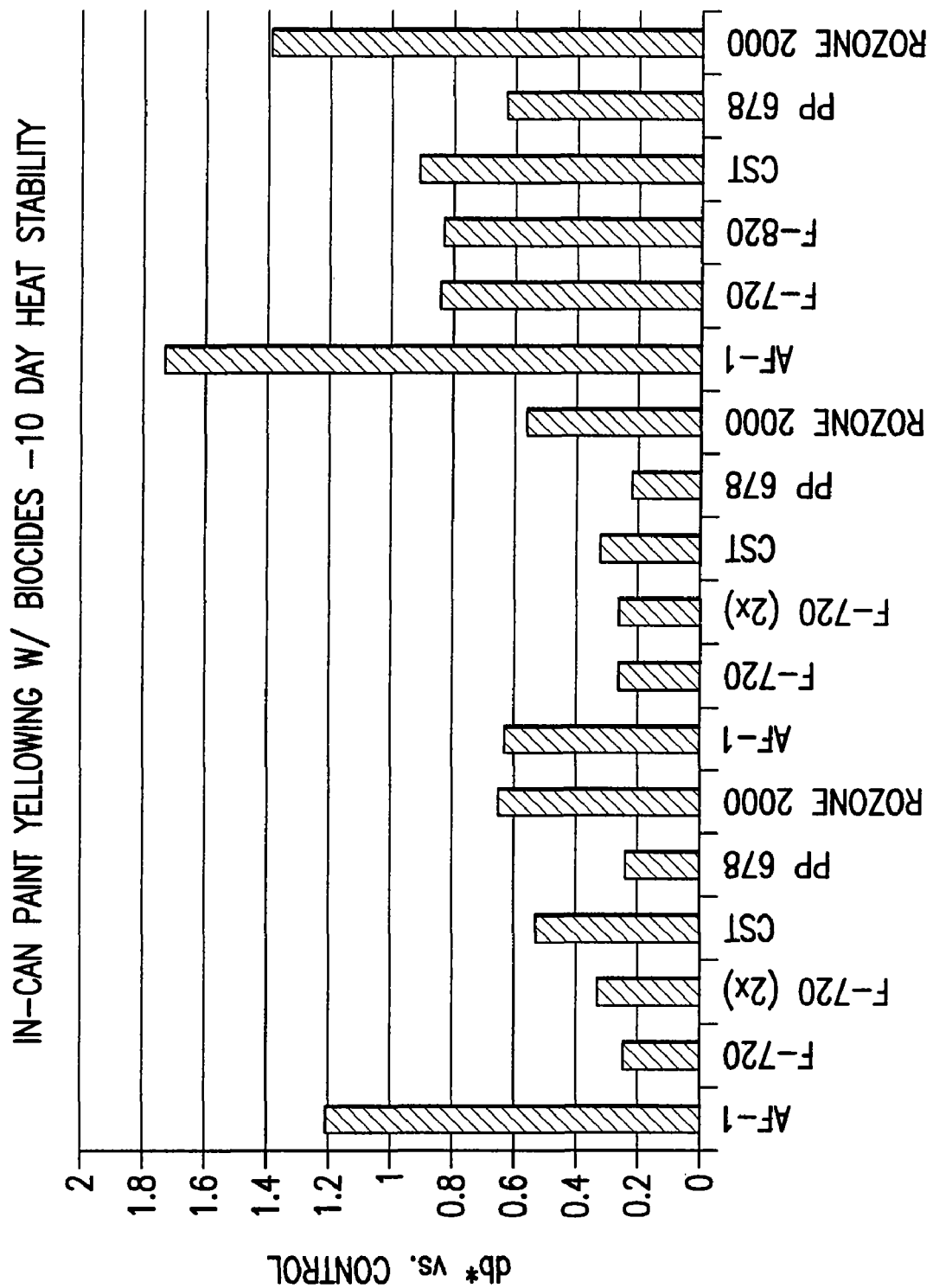
FIG. 3 depicts yellowing of coatings which contain specified biocides and stabilized or non-stabilized PGME, or commercial coalescent.

A gloss paint was formulated and tested with various coalescing solvents (Texanol, Archer RC, etc.) and biocides. Archer RC stabilized with 0.2% BHT was combined with paint containing a specific biocide. The formulation containing the Polyphase AF-1 (FIG. 3, AF-1, left column) exhibited the most yellowing. The histogram of FIG. 3 shows that preferred biocides in combination with stabilized Archer RC are Fungitrol 720, Polyphase CST, Polyphase 678 and Rozone 2000. The FIG. 3 histogram shows the comparable yellowing of stabilized PGME containing formulations to formulations containing Texanol. Archer RC without BHT (non-stabilized Archer RC) exhibits the highest yellowing as indicated by the data set on the right third of the histogram. The peroxide value of non-stabilized Archer RC was 313 in this experiment.

Example 4

Δ Peroxide Value in Heated PGME Storage

Peroxide values of heated Stripped Sun PGME (4298-173). Samples were in open bottles placed in a 140° F. forced draft oven.

|  | 0.0% BHT | 0.05% BHT | 0.10% BHT | 0.15% BHT | 0.20% BHT |
|---|---|---|---|---|---|
| Initial | 3.90 | 3.90 | 3.90 | 3.90 | 3.90 |
| 4 days | 23.85 | 9.45 | 7.92 | 6.52 | 6.22 |
| 1 week | 72.13 | 14.72 | 11.55 | 8.19 | 7.44 |
| 2 weeks | 151.86 | 22.77 | 15.65 | 11.30 | 9.45 |
| 3 weeks | 185.51 | 39.45 | 24.72 | 20.06 | 17.78 |
| 4 weeks | 204.17 | 73.38 | 36.09 | 25.87 | 22.17 |
| 5 weeks | 313.09 | 81.20 | 48.81 | 33.68 | 26.32 |

Archer RC aged for 5 weeks had the following peroxide values: without BHT, 313; with 0.1% BHT, 48; with 0.15% BHT, 34; and with 0.20% BHT, 26. BHT is effective in preventing the oxidation of the ester composition.

Having now fully described this invention, it will be understood to those of ordinary skill in the art that the same can be performed within a wide and equivalent range of conditions, formulations, and other parameters without affecting the scope of the invention or any embodiment thereof. All patents, patent applications, and publications cited herein are fully incorporated by reference herein in their entirety.

What is claimed is:

1. A latex film-forming composition, comprising a latex polymer a stabilized glycol ester of a vegetable oil fatty acid and an antioxidant, wherein said antioxidant is a phenolic antioxidant or butylated hydroxyl toluene.

2. The latex film-forming composition of claim 1, wherein said stabilized glycol ester has a peroxide value below about 50.

3. The latex film-forming composition of claim 1, wherein said stabilized glycol ester is a stabilized propylene glycol monoester.

4. The latex film-forming composition of claim 3, wherein said stabilized propylene glycol monoester contains at least about 80 percent monoesters.

5. The latex film-forming composition of claim 4, wherein said stabilized propylene glycol monoester has a Lovibond color below about 0.6 Red and below about 1.5 Yellow.

6. The latex film-forming composition of claim 1, wherein said vegetable oil fatty acid is derived from a vegetable oil selected from the group consisting of a genetically modified oil, soybean oil, linseed oil, sunflower oil, corn oil, canola oil, rapeseed oil, palm kernel oil, cottonseed oil, peanut oil, coconut oil, palm oil, tung oil and safflower oil and derivatives and mixtures thereof.

7. The latex film-forming composition of claim 1, wherein said vegetable oil fatty acid is derived from a polyunsaturated vegetable oil.

8. The latex film-forming composition of claim 7, wherein said polyunsaturated vegetable oil contains less than about 2 percent of C18:3 or high polyunsaturated fatty acids.

9. The latex film-forming composition of claim 8, wherein said polyunsaturated vegetable oil is safflower oil, sunflower oil or corn oil.

10. The latex film-forming composition of claim 1, wherein said stabilized glycol ester is a stabilized propylene glycol monoester containing at least about 80 percent monoesters, wherein said monoester is derived from a polyunsaturated vegetable oil containing less than about 2 percent of C18:3 or higher polyunsaturated fatty acids.

11. The latex film-forming composition of claim 10, wherein said propylene glycol monoester has a peroxide value below about 50.

12. The latex film-forming composition of claim 10, wherein said stabilized propylene glycol monoester has a Lovibond color below about 0.6 Red and below about 1.5 Yellow.

13. The latex film-forming composition of claim 12, wherein said propylene glycol monoester is derived from safflower oil, sunflower oil or corn oil.

14. The latex film-forming composition of claim 1 further comprising a biocide.

15. The latex film-forming composition of claim 14, wherein said biocide contains at least one percent of 3-iodopropynyl butyl carbamate or 4,5-dichloro-2-n-octyl-4-isothiazolin-3-one, relative to the total weight of said biocide.

16. The latex film-forming composition of claim 1 further comprising one or more pigments.

* * * * *